United States Patent [19]

Cunningham

[11] Patent Number: 5,320,663
[45] Date of Patent: Jun. 14, 1994

[54] METHOD OF OBTAINING LEAD AND ORGANOLEAD FROM CONTAMINATED MEDIA USING METAL ACCUMULATING PLANTS

[75] Inventor: Scott D. Cunningham, Chaddsford, Pa.

[73] Assignee: E. I. Du Pont de Nemours and Company, Wilmington, Del.

[21] Appl. No.: 908,279

[22] Filed: Jul. 2, 1992

[51] Int. Cl.$^5$ .......... C12S 1/00; C07G 17/00; A62D 3/00; C02F 3/32
[52] U.S. Cl. .......... 75/432; 210/602; 435/262; 435/267; 588/231
[58] Field of Search .......... 435/262, 267; 210/602; 588/231; 405/129; 75/432; 424/195.1

[56] References Cited

U.S. PATENT DOCUMENTS

| | | | |
|---|---|---|---|
| 3,846,290 | 11/1974 | Raymond | 210/31 |
| 4,493,895 | 1/1985 | Colaruotolo et al. | 435/262 |
| 4,511,657 | 4/1985 | Colaruotolo et al. | 435/253 |
| 4,588,506 | 5/1986 | Raymond et al. | 210/606 |
| 4,826,602 | 5/1989 | Revis et al. | 210/611 |

FOREIGN PATENT DOCUMENTS

| | | |
|---|---|---|
| 3921336 | 1/1991 | Fed. Rep. of Germany . |
| 57000190 | 5/1980 | Japan . |
| 57-190 | 1/1982 | Japan . |

OTHER PUBLICATIONS

Jain et al., Azolla Pinnata R.BR. and Lemna Minor L. for Removal of Lead and Zinc from Polluted Water, *Water Research*, 24, No. 2, 177-183, Feb. 1990.

Menser, H. A. et al., *Environmental Pollution*, 18, No. 2, 87-95, Feb. 1979.

Zirschky, J. et al., The Use of Duckweed for Wastewater Treatment, *Journal of the Water Pollution Control Federation*, 60, No. 7, 1253-1258, Jul. 1988.

Folsom, et al., Applied and Environmental Micrrobiology, vol. 57(6) 1991, pp. 1602-1608.

Baker, et al., Biorecovery, 1989, vol. 1., pp. 81-126.

R. L. Chaney., in "Land Treatment of Hazardous Wastes", pp. 50-77, (1983), Parr et al., Ed.

Menser et al., Environ. Pollut. (18) (1979), pp. 87-95.

Baker et al., in "Heavy Metal Tolerance in Plants: Evolutionary Aspects" (1989), pp. 155-177 Chapter 11, Shaw Ed.

93:23792 *Biobusiness* Abstract (1993).

Primary Examiner—Michael G. Wityshyn
Assistant Examiner—Timothy J. Reardon

[57] ABSTRACT

It has been found that Ambrosia sp. and Apocynum sp. accumulate lead in the leaves, stems, and roots when it grows in soil containing organic or inorganic species of lead. Lead is accumulated in the leaves and stems to a greater extent than in most other plants. Lead can be economically recovered from contaminated soil and sludge by harvesting Ambrosia sp. or Apocynum sp. grown in media containing high concentrations of lead.

11 Claims, No Drawings

METHOD OF OBTAINING LEAD AND ORGANOLEAD FROM CONTAMINATED MEDIA USING METAL ACCUMULATING PLANTS

FIELD OF INVENTION

The invention relates to the use of green plants which have the capacity to accumulate high levels of lead in their tissues to remediate contaminated soil and water. The invention relates specifically to the use of Ambrosia sp. (ragweed) and Apocynum sp. (dogbane) in this capacity and to the remediation of lead and lead containing (organolead) compounds.

BACKGROUND

In recent years contamination of soil and ground water with heavy metals has been identified as a serious environmental hazard. Heavy metals are known to be toxic to most wildlife and man in relatively low concentrations. Elements such as lead, platinum, mercury, cadmium, cobalt, zinc, tin, arsenic, and chromium are used in many industrial applications and often significant levels of these metals are found in industrial waste streams. Heavy metals are also found in organic form such as organoarsenic and organotin, used as pesticides or herbicides, as well as nickel tetracarbonyl and tetraethyllead produced as by-products of the petroleum industry.

A number of methods have been described to remediate soil and ground water containing toxic chemicals. These methods primarily focus on concentration and removal or containment of contaminated media or on the use of microbes to enzymatically transform toxins to inert forms. Revis et al. (U.S. Pat. No. 4,826,602) claim that contacting aqueous waste with a culture of Pseudomonas maltophilica ATCC 53510 will reduce the concentration of ionic species of heavy metals. Colaruotolo et al. (U.S. Pat. No. 4,511,657) teach the use of specially adapted microbial cultures to treat obnoxious waste, especially halogenated organic chemical waste (U.S. Pat. No. 4,493,895).

The use of bioreactors and in-situ stimulation of indigenous microflora are two current approaches to the decontamination of soil and ground water. Bioreactors have been designed to utilize microorganisms for the bioremediation of a variety of toxic contaminants, including trichloroethylene, phenol and toluene. (Folsom et al. 1991 *Applied and Environmental Microbiology*. 57:1602-1608). In-situ bioremediation involves the growth of indigenous, contaminant-degrading microorganisms which are enhanced by adding nutrients and oxygen. Raymond (U.S. Pat. No. 3,846,290 and U.S. Pat. No. 4,588,506) teaches a process in which oxygen and nutrients are supplied to biota for stimulating the biooxidation of hydrocarbons contaminating ground water without the addition of microorganisms to the contaminated environment.

The methods cited above are useful and clearly show that microorganisms can be used to remove toxic compounds, from both soil and aqueous environments. There are, however, several disadvantages to the methods outlined in the existing art. Examples given in the art describe decontamination of the environment using specific naturally occurring, or genetically engineered cultures of bacteria or yeast or the preliminary harsh chemical treatment of toxic contaminants prior to biological treatment by indigenous microbes. The isolation or engineering, culturing and inoculation of specific microorganisms particularly selected for the degradation of specific organic contaminants is labor intensive and time consuming. Bioreactors can allow for effective microbial growth with greater control over nutrient addition, temperature, pH, and concentration, however, in bioremediation projects, materials must be pumped out or excavated and soils must be handled and sorted which is also labor intensive. Bioremediation efforts that utilize in-situ methods have been effective in degrading certain toxic compounds, however, they have not addressed the specific problem of metal and organometal contamination. Many of the problems associated with these techniques have provided the incentive to look to the use of green plants for simpler and more economically attractive means of remediating soil and ground water of heavy metal species.

It has been know for some time that many plant species will concentrate certain metals in their leaves, stems and roots to a varying degree. (Baker et al., *Ecophysiology of Metal Uptake by Tolerant Plants* In: "Heavy Metal Tolerance in Plants: Evolutionary Aspects" A. J. Shaw (ed.) CRC Press (1989)) teach that a green plant's response to a metalliferous environment ranges from active exclusion of the metallic species to tolerance to accumulation and even hyperaccumulation where concentrations may approach greater than 1% of plant dry matter. The phenomenon of accumulation and hyperaccumulation of metals by plants has been demonstrated over a wide range of plant families and to date it has not been possible to predict which plants of which families will function as metal accumulators and/or hyperaccumulators. Further complicating the issue is the fact that plants that might be classified as hyperaccumulators of one metal species may be barely tolerant of another. Hence the phenomenon is specific not only for plant type but also for metal species. (Baker et al., *Ecophysiology of Metal Uptake by Tolerant Plants* In: "Heavy Metal Tolerance in Plants: Evolutionary Aspects" A. J. Shaw (ed.) CRC Press (1989)) For example various species of Alyssum are known to be hyperaccumulators of nickle reaching levels of 13400 ugNi/g but do not appear to be hyperaccumulators of other metals. Thlaspi sp. on the other hand demonstrate hyperaccumulation of a variety of metals including nickle, zinc, and lead. To date the plant that has shown the greatest ability to accumulate lead is *Thlaspi rotundifloium* attaining levels of 8200 ugPb/g dry weight of the plant. (Baker et al., *Ecophysiology of Metal Uptake by Tolerant Plants* In: "Heavy Metal Tolerance in Plants: Evolutionary Aspects", A. J. Shaw (ed.) CRC Press (1989)) A summary of many of the known hyperaccumulators is included in Baker et. al., *Terrestrial high plants which hyperaccumulate metallic elements—a review of their distribution, ecology and phytochemistry*, Biorecovery, 1, 81, (1989) herein incorporated by reference.

The work surrounding the studies of accumulation and hyperaccumulation of metals by plants has been focused in the areas of using these plants as indicators of metal contamination and as study models to prevent toxic metal accumulation in food crops. The concept of utilizing the accumulating phenomena as a tool to extract metals from a contaminated environment was discussed by R. L. Chaney, *Plant uptake of Organic waste constituents* In: "Land Treatment of Hazardous Wastes", Parr et al. (ed.) Noyes Data Corporation New Jersey (1983). Chaney notes that hyperaccumulators of nickle, and copper are known to accumulate these metals to as much as 1% of dry plant weight and suggests that they might be used to bioconcentrate these metals from land treatment sites. Chaney, however does not teach a method for accomplishing the bioconcentration.

Takashi Utsunomiya (JP 57000190) teaches the use of various plants including those of the genera Polygonaceae, to remove heavy metals and particularly cadmium and mercury from contaminated soil by the steps of cultivating the plants in the contaminated soil, and removing the plants from said soil after the plants have reached a certain stage of growth. Utsunomiya also teaches a poorly defined link between the presence of certain glycoside compounds in these plants and their ability to accumulate the desired metals. Utsunomiya also anticipates the use of these plants in hydroponic systems to remediate aqueous environments of metal contamination. The invention of Utsunomiya does not teach the use of these plants to concentrate organic or inorganic lead species. Furthermore the plants used by Utsunomiya accumulate metals only to levels of less than 100 ppm, putting them outside the class of plants considered to be significant metal accumulators and calling into question the practical utility of these plants to concentrate toxic metals.

M. Rogmans (DE 3921336) also teaches a process for the use of Polygonum sp. to remediate soil of liquid soluble contaminants including cadmium, lead, and zinc. Rogmans also teaches the production of a heavy metal resistant strain of Polygonium sp. via the selection of high metal capacity cell lines and the regeneration of these cells to form a new, high metal resistant plant. Rogmans does not teach the use of Ambrosia sp. or Apocynum sp. for this purpose.

Menser, H. A. et al., *Environmental Pollution* 18(2), 87–95, (1979) describe the analysis of several plants, including common ragweed (*Ambrosia artemisiifolia*) and smartweed (*Polygonum pennsylvanicum*) isolated from a municipal landfill for concentrations of various heavy metals including Mh, Cu, Co, Cr, and Pb. The highest concentration of Pb that was recorded for either plant was 3.68 ppm dry weight of the plant. Mense does not teach accumulation or hyperaccumulation of lead by ragweed or dogbane.

Ideally, requirements for a plant to be used for the purpose of remediating soil, water, and other contaminated media from heavy metals would be that it should be an accumulator of the desired heavy metal (i.e., be able to accumulate levels of at least 1000 mg/kg in the above ground tissues), be a hardy plant that will withstand a broad range of weather and environmental conditions and that it be fast growing to permit harvesting of several crops per growing season. Additionally, some benefit may be accrued by the plant being easily adapted to hydroponic growth conditions. It is the object to the present invention to provide the members of the genera Ambrosia (ragweed) and Apocynum (Dogbane) as such plants and to provide a process for the remediation of contaminated soil, water and other media of lead and organolead compounds.

SUMMARY OF THE INVENTION

The present invention relates to a method of remediating soil, water, and other media contaminated with various species of organic and inorganic forms of lead from said lead by a process comprising the steps of:

(i) growing one of more Ambrosia sp. or Apocynum sp. plants in a medium containing organic or inorganic lead species under conditions suitable for growth of Ambrosia sp. or Apocynum sp. for a time sufficient for plants parts to accumulate lead;

(ii) harvesting the plants from the medium; and (iii) concentrating the lead.

DETAILED DESCRIPTION OF THE INVENTION

In the context of this disclosure and claims a number of terms are utilized.

The term "contaminated media" refers to wastewater, soil, sediment, sludge, or composted materials, or any plant medium that contains higher than regionally ambient levels of heavy metals, and particularly lead.

The term "hydroponic" refers to the cultivation of plants in water containing dissolved inorganic nutrients, rather than in soil.

The term "hydroponic solution" will refer to any liquid media used to maintain plant growth in a hydroponic system.

The term "hydroponic systems" refers to any method of growing plants hydroponically that incorporates a fluid filled reservoir containing a place where plants may be inserted such that the plant roots remain in constant contact with the fluid and where said reservoir contains both an intake port and an outflow port wherein said fluid may be circulated through the reservoir at varying or constant flow rates.

The term "accumulator" refers to any green plant that has the capacity to accumulate heavy metals in the leaves and stems in excess of 100 mgM/kg (dry weight of plant tissue) where M is a species of heavy metal.

The term "contaminant" refers to any toxic species found in the contaminated media consisting of heavy metals, including elemental and ionic species of said heavy metals, and related organometal complexes.

The term "side dressing" refers to application of nutrients to growing plants as opposed to broadcasting the nutrients over the field surface.

The term "plant parts" refers to any part of the plant that may accumulate heavy metals comprising the leaves, the stems, flowers, fruits, seeds, and the roots.

The term "hyperaccumulator" refers to any plant that is capable of accumulating a metal species to levels equal to or greater than 10,000 mg/kg (1%) of its dry weight.

The term "organolead" refers to any compound which contains both lead and carbon substituents. "Organic lead" and "organic lead species" have the same intended meaning.

The present invention provides a method of remediating soil, groundwater, waste water, water treatment sludge, and composted material contaminated with various organic or inorganic species of lead by growing members of the Ambrosia genus (ragweed) or Apocynum (dogbane) genus in crop form and allowing the plants to accumulate the lead species into the leaves and stem portions of the plants. Plants are harvested and the lead species is processed for environmentally acceptable recovery or disposal.

Any Ambrosia sp. may be used including *A. Bidentata* (lanceleaf ragweed), *A. tomemtosa* (skeletonleaf bursage), *A. grayi* (woollyleaf bursage), *A. trifida* (giant ragweed), and *A. psilostachya* (western ragweed). However, common ragweed, *A. elatior* or *A. artemisiifolia*, is most preferred. Any Apocynum sp. may be used including *Apocynum androsaemifolium* (Spreading Dogbane) but *Apocynum cannabinum* (Hemp Dogbane or Indian Dogbane) is most preferred. Ragweed or dogbane may be grown from seed in a crop setting or immature plants may be used. Conditions for the growth of the plants may vary, however, most preferred are conditions that permit the maximum amount of lead to be accumulated in the harvestable parts of the plants in the shortest period of time.

Many factors need to be considered when preparing a contaminated site for remediation by plant metal accumulators. In general an in-depth assessment of the site will be needed to determine the problems to be overcome before remediation can begin. Depth of the contaminant must be within the effective rooting depth of the plant in question, or must be brought within that depth by physical means. The effective rooting depth is dependent on plant genotype, environmental factors (such as water and nutrient availability and placement) and physical or chemical limitations within a soil profile. Concentration of the contaminant, is also important and an evaluation of the regulatory limit and time allowable for remediation becomes a factor when considering the cost and feasibility of remediation in this manner. Presence of other materials requiring remediation and their effect on plant life as well as recommended human exposure levels, and environmental risks associated with their presence and handling are also factors to be considered.

Included in the initial assessment of the site must be the evaluation of various physical and chemical characteristics of the contaminated media. The media must be capable of supporting plant growth or be made capable of doing so. This constraint has implications for bulk density, permeability, shear strength, water-holding capacity, oxygen permeability, and variability in both horizontal and vertical profiles. Bringing the physical nature of the materials to be remediated into compliance with these requirements may involve the addition of bulking agents (organic matter, sludges, manures, etc.), chemical components (calcium sulfate, lime, sulfur, etc.), or physically disturbing the soil surface by mechanical means.

Various aspects of soil chemistry will also affect the effectiveness of the remediation process and preferred conditions will maximize both the growth rate of the plants and the bio-availability of lead in the soil. In the case of lead remediation the preferred pH of the soil is in a range of pH5–pH8. Phosphate is a requirement for ragweed or dogbane growth and soil is amended to maintain phosphate concentrations at levels compatible with plant growth. Addition of phosphate, however, must be monitored with respect to lead solubility in the soil, since high phosphate concentrations will encourage the formation of lead phosphate which will cause lead to precipitate and decrease the amount of soluble lead available to the plant. In a similar fashion, alkaline soil cannot be rapidly acidified since this would cause a rapid increase in the amount of available soluble lead and could lead to plant toxicity or leaching of the contaminant into the groundwater. Regulation of soil chemistry to maximize lead bio-availability and minimize plant toxicity involves a process of measuring lead concentration in the contaminated media and altering the soil chemistry accordingly. (*Soil Testing and Plant Analysis*, R. L. Westerman (ed.), Soil Science of America, Inc., Madison (1990) and *Methods of Soil Analysis*, Parts 1 and 2, Chemical and Microbiological Properties, A. L. Page (ed.) Soil Science Society of America Inc., Madison (1982)).

Growing the ragweed or dogbane crop will entail fertilizing and watering the plants in a manner commensurate with good plant growth. A plant pest control program may also be employed to control various microbial plant pathogens, nematodes, insects, weeds, herbivores and the like. Harvesting of the plants may be accomplished in a variety of ways. Plants may be harvested one or more times during the growing season, or they may be left unharvested for several years and the dead and living organic matter collected and processed together. The manner of harvesting will depend on the nature and severity of the contamination at the site to be remediated and will be governed by economic and regulatory factors. The most preferred manner of harvesting will be to harvest plant parts one or more times over the course of a growing season such that the maximum amount of lead is obtained from the contaminated media in the shortest period of time.

Concentrating the lead from plants after harvesting may be accomplished either by direct smelting of the bulk plant matter or may incorporate a number of volume reduction steps before the smelting process. Methods of reducing the bulk volume of the plant matter include incineration, anaerobic and aerobic digestion, acid digestion or composting. The most preferred method of concentration is a method that involves one or more of the above mentioned volume reduction methods followed by direct smelting. Smelting of lead containing material is a technique well known in the art and variations on the method are given in Lead smelting and refining: its current status and future, M. Kazue, Lead-Zinc 1990, Proc. World Symp. Metall. Environ. Control 119th TMS Annu. Meet., 23–38 T. S. Mackey (ed.); Miner. Met. Mater. Soc.: Warrendale, Pa. (1990) herein incorporated by reference.

Another embodiment of the invention is the use of ragweed or dogbane in a hydroponic system to remediate lead species from aqueous environments. In this embodiment the plant roots are in contact with the liquid media to be remediated. This may be accomplished by growing the plants in large hydroponic systems, by growing them on solid support systems (e.g., wire mesh, peat, sand, or gravel) where the contaminated liquid is pumped to the plant roots, or by growing the plants on floating mats in contaminated pools or trapped water. Plant nutrients may be applied either directly to the contaminated water or may be applied foliarly. Care is needed when applying nutrients, and particularly phosphate so as not to reach concentrations that will precipitate the lead in the contaminated media. Regulation of nutrient concentrations is done empirically through a process of measurement of nutrient and lead concentration in the contaminated media and. plant tissue and can be accomplished by means well known in the art.

Under laboratory conditions ragweed or dogbane seed may be somewhat resistant to germination. It is often useful to treat the seeds prior to planting to facilitate germination. Many methods of encouraging seed germination are known including, treatment with plant growth regulators, nitrogenous compounds or respiratory inhibitors, soaking the seeds in acid to permeate the seed coat and methods such as exposing the seed to extreme temperatures. Most preferred is a method involving treatment of the seed with concentrated sulfuric acid followed by rapid rinsing in copious amounts of deionized water and finally soaking the seeds overnight in deionized water.

Plant and soil samples suspected of containing lead must be treated to release entrapped lead before lead concentrations can be determined. Many methods of releasing lead are known including ashing, acid digestion and others which are outlined in *Introduction to Microwave Sample Preparation:Theory and Practice*, H. M. Kingston (ed.) American Chemical Society, Washington (1988) and *Soil Testing and Plant Analysis*, R. L. Westerman (ed.), Soil Science of America, Inc., Madison (1990). Most preferred is digestion in an open vessel microwave digester typified by the A-300 model manufactured by PROLABO (Questron Corp., Princeton N.J.). Samples to be digested are subjected to acid treatment in conjunction with rapid heating from microwave radiation in order to release entrapped lead. Treatment with concentrated nitric acid followed by concentrated perchloric acid is most preferred.

There are many instrumental techniques available for analysis of toxic heavy metals. Among the most commonly employed methods are flame and furnace atomic absorption spectrophotometery (AAS) and anode stripping voltametry and polarographic techniques. Most preferred is the method of inductively coupled atomic plasma spectroscopy (ICP) and the instruments most preferred are those similar to the SPECTROFLAME-ICP (Spectro Analytical Instruments Inc., Fitchburg, Mass.). In order to accurately determine concentrations of lead by any spectroscopic method the method must incorporate some standard of similar organic composition and containing a known amount of lead to be detected. Any suitable standard may be used however Pine Needle Standards and Buffalo River Sediment Standards containing known amounts of lead obtained from the National Institute of Science and Technology (NIST) are most preferred. Plant tissue and sediment standards are subjected to acid digestion and analysis by ICP along with samples suspected of containing lead.

The following examples are meant to exemplify the invention but are not meant to limit the invention in any way.

EXAMPLES

EXAMPLE 1

Identification of Lead Accumulating Plants Plant and Soil Sample Digestion:

In order to determine lead concentration in plant tissue the tissue was first digested by the following method. Plant tissue suspected of containing lead was dried for 5 days at 80° C. and ground using a Wiley Mill (size 10 mesh). 200 ug of ground plant tissue was placed in an A-300 Automatic Microwave Digester (AMD) (PROLABO, (Questron Corp., Princeton N.J.). The AMD added 10 ml concentrated nitric acid to the plant sample and 35% power was applied for 10 minutes. The AMD then added 5 ml of concentrated perchloric acid to the sample and 35% power was applied for 5 minutes. This was immediately followed by an increase in power to 40% for 5 minutes. After digestion the samples were diluted 50 fold with 10% nitric acid, filtered through a 0.45u filter and lead content was determined on the SPECTROFLAME-ICP (Spectro Analytical Instruments Inc. Fitchburg, Mass.). Plant tissue standards obtained from the NIST were subjected to the same digestion protocol and ICP analysis and were used as standards for lead analysis. The NIST standard used for plant tissue was Pine Needles, (lot number 1575) containing 10.8 mgPb/kg and were used as standards from which milligrams lead per kilogram of plant tissue (mgPb/kg) was calculated.

Lead bound in soil is more recalcitrant to digestion and requires an additional perchloric acid step in the digestion procedure. Soil suspected of containing lead was air dried and 0.5 g samples were placed in the AMD. The AMD added 10 ml concentrated nitric acid to the samples and 35% power was applied for 10 minutes. This was followed by and immediate increase in power to 40% for 3 minutes. 5 ml of concentrated perchloric acid was then added to the samples and the digester was maintained at 40% power for 8 min. This was followed by the addition of another 2 ml of perchloric acid for an additional 3 minutes at 40% power. After digestion the samples were diluted 50 fold with 10% nitric acid, filtered through a 0.45u syringe filter and lead content was measured using the ICP. Buffalo River Sediment Standards (lot number 2704) obtained from the NIST containing 161 mgPb/kg were subjected to the same digestion protocol and ICP analysis as the soil samples and were used as standards from which milligrams lead per kilogram of plant tissue (mgPb/kg) was calculated.

Nutrient Media

Low phosphate nutrient growth media was prepared using readily available nutrients. The composition is given below in Table I.

TABLE I

| 2 liter bottle # | gms nutrient added to the 2 liter stock bottle | | Formula weight of material | ml/l for final solution | Final Solution element | Final element (conc) mM | Micros nutr. | in uM |
|---|---|---|---|---|---|---|---|---|
| 1 | 0.32 | KH$_2$PO$_4$ | 136.09 | 1 | P | 0.010 | Fe | 10.0 |
| 2 | 202.0 | KNO$_3$ | 101.1 | 1 | K | 1.5 | Mn | 1.0 |
| 3 | 493.0 | MgSO$_4$.7H$_2$O | 246.5 | 1 | Ca | 2.0 | B | 1.0 |
| 4 | 472.0 | Ca(NO$_3$)$_2$.4H$_2$O | 236.16 | 2 | Mg | 1.0 | Cu | 0.2 |
| 5 | 5.6 | FeSO$_4$.7H$_2$O | 278.02 | 1 | S | 1.0 | Zn | 1.0 |
|   | 18.6 | Na$_2$EDTA.2H$_2$O | 372.24 |   |   |   |   |   |
| 6 | 74.6 | KCl | 74.55 | 1 | N | 5.0 | Mo | 0.2 |
| 7 | 0.124 | H$_3$BO$_3$ | 61.84 | 1 | Cl | 0.5 | Ni | 0.13 |
| 1-7 in all | 0.338 | MnSO$_4$.H$_2$O | 169.01 |   |   |   | Co | 0.13 |
| nutrient | 0.576 | ZnSO$_4$.7HO | 287.54 |   |   |   | EDTA | 25.0 |
| solutions | 0.100 | CuSO$_4$.5H$_2$O | 249.75 |   |   |   | Pb | 4.8 |
|   | 0.576 | MoO$_3$ | 143.94 |   |   |   |   |   |
|   | 0.060 | CoCl$_2$.6H$_2$O | 237.93 |   |   |   |   |   |
|   | 0.060 | NiCl$_2$.6H$_2$O | 237.71 |   |   |   |   |   |
| 8 | 3.2 | Pb(NO$_3$)$_2$ (62.5% Pb by wt.) (1 g/l. Pb = 1000 ppm) | 331.20 MW Pb 207.2 | 1 |   |   |   |   |

Identification of Lead Accumulator Plants 100 different plant samples from a site contaminated with lead were collected at random by removing leaves and stems from each plant. Leaves and stems from each plant sample were dried for 5 days at 80° C., and ground using a Wiley Mill with a size 10 mesh screen. After grinding, 200 ug samples were digested using the procedure outlined above. After digestion lead content was determined using the ICP and the data are tabulated in Table II. As can been seen from the data, only two species (Ambrosia sp. (Ragweed) and Apocynum (Dogbane)) could be identified as potential accumulators of lead. Ragweed had levels of 839 total mgPb/kg and had values of over 2000 mgPb/kg in the roots. Hemp dogbane attained levels of 349 mgPb/kg in the above ground parts of the plant. Of all the other plants tested for lead levels in this initial screen most were not taxonomically identified and only a sample have data tabulated in Table II. However, none of the unidentified plants had confirmed lead levels any higher than 10–15 mgPb/kg in any sample analyzed. On the basis of this data ragweed was identified as having the most potential for remediation of lead from contaminated media.

7500 mgPb/kg. The soil from the contaminated site was air dried at room temperature. Ragweed seedlings, germinated by the above procedure and grown in uncontaminated soil were then transplanted to the contaminated soil and watered daily with a low phosphate nutrient medium defined in Table I. An identical set of seedlings were transplanted in METROMIX potting soil (Grace/Sierra Horticultural Products Co. Milpitas, Calif.) containing no lead as indicators of normal plant growth. All plants were grown for 30 days in a PGR-15 growth chamber (Conviron Corp., Asheville, N.C.) under conditions of a 16 hr day at a day temperature of 25° C. and a night temperature of 20° C. where light intensity was 980 uEinsteins/m$^2$/sec. After 30 days the plants were harvested and lead concentrations were determined in the stems and leaves of the plants as described in Example 1. Data showing lead accumulation in the leaves and stems are tabulated below in Table III. Visual inspection of the plants grown in lead contaminated soil and those grown in the lead-free METROMIX potting soil indicated that there were no obvious ill effects on the health or growth of the plants grown in lead contaminated soil.

TABLE II

| Date | Field Number | Plant Type | ICP Number | Dilution Factor | Standard Curve Range | Total mgPb/kg |
| --- | --- | --- | --- | --- | --- | --- |
| 8/30/91 | 56-3, leaf and stem | common ragweed | 17.2 | 50 | 0–20 | 839 |
| 9/14/91 | bottom leaf | common ragweed | 9.27 | 50 | 0–20 | 434 |
| 9/14/91 | bottom stem | common ragweed | 10.4 | 50 | 0–20 | 490 |
| 9/14/91 | roots | common ragweed | 43.1 | 50 | 0–20 | 2125 |
| 9/14/91 | roots | common ragweed | 42.9 | 50 | 0–20 | 2115 |
| 8/29/91 | 94, leaf and stem | hemp dogbane | 7.14 | 50 | 0–20 | 349 |
| 8/27/91 | 10, leaf and stem | | −20.3 | 50 | 0–1000 | 0 |
| 8/27/91 | 41, leaf and stem | | −12.8 | 50 | 0–1000 | 0 |
| 8/27/91 | 61, leaf and stem | | −6.65 | 50 | 0–1000 | 0 |
| 8/28/91 | 84, leaf and stem | | 0.643 | 50 | 0–20 | 7 |
| 8/27/91 | 9, leaf and stem | | −18.6 | 50 | 0–1000 | 0 |
| 8/27/91 | 29, leaf and stem | | −9.44 | 50 | 0–1000 | 0 |
| 8/27/91 | 37, leaf and stem | | −6.81 | 50 | 0–1000 | 0 |
| 8/27/91 | 44, leaf and stem | | −5.38 | 50 | 0–1000 | 0 |
| 8/27/91 | 54, leaf and stem | | −8.35 | 50 | 0–1000 | 0 |
| 8/27/91 | 55, leaf and stem | | −9.91 | 50 | 0–1000 | 0 |
| 8/27/91 | 59, leaf and stem | | −12.3 | 50 | 0–1000 | 0 |
| 8/27/91 | 66, leaf and stem | | −16.5 | 50 | 0–1000 | 0 |
| 8/27/91 | 67, leaf and stem | | −5.93 | 50 | 0–1000 | 0 |
| 8/27/91 | 70, leaf and stem | | −10.4 | 50 | 0–1000 | 0 |
| 8/27/91 | 72, leaf and stem | | −10 | 50 | 0–1000 | 0 |
| 8/27/91 | 76, leaf and stem | | −7.37 | 50 | 0–1000 | 0 |
| 8/27/91 | 77, leaf and stem | | −14.9 | 50 | 0–1000 | 0 |

EXAMPLE 2

Lead Accumulation in Ragweed from Lead Contaminated Soil Samples

Ragweed Seed Germination:

Ragweed seed may be resistant to germination and in order to increase the germination rate of the seed under laboratory conditions the following treatment was used. Ragweed seeds were soaked in concentrated sulfuric acid for 30 minutes. The seeds were then rinsed in a rapidly flowing bath of deionized water for 1 minute followed by soaking in 500 ml deionized water overnight. At the end of this procedure seeds were planted under normal incubation conditions.

Lead Accumulation from Lead Contaminated Soil

Soil samples were collected from a lead contaminated site and analyzed for lead content according to the procedure outlined in Example 1. Lead content in the soil from the contaminated site was determined to be

TABLE III

| Plant Type | Plant Part | Total mgPb/kg |
| --- | --- | --- |
| Ragweed | Leaves | 1251 |
| Ragweed | Upper Stem | 7.75 |
| Ragweed | Lower Stem | 218 |

The data indicate that ragweed is capable of accumulating 1251 mg Pb/kg from the soil into the leaf tissue.

EXAMPLE 3

Comparison of Lead Accumulation by Ragweed, Dogbane and Sugarbeet in a Hydroponic System Ragweed, sugarbeet and hemp dogbane plants were placed in two, 2 gallon hydroponic perfused systems containing the low phosphate nutrient media described in Table I. A bubbler tube from a pump was inserted which served to provide oxygen to the system and mix the fluid. Experimental plants received a constant level of 1 mgPb/kg in the nutrient solution while the control plants had no Pb in the nutrient solution. Experimental and control plants were grown for 30 days under identical conditions in a PGR-15 growth chamber (Conviron Corp., Asheville, N.C.) of 16 hr day length, 25° C. day time temperature, 20° C. night time temperature and at a light intensity of 980 uEinsteins/m$^2$/sec. Perfusion of the nutrient media was begun at 8 ml/hr in both systems. The perfusion flow rate was increased to 15 ml/hr on day 11 and increased again from 15 ml/hr to 30 ml/hr on day 19. The lead concentration in the bulk experimental system was maintained at 1 mgPb/kg over the life of the experiment. Outflow from both systems was collected for lead analysis. At the end of 30 days the plants were harvested and leaves, stems and roots were analyzed for lead content. Data is tabulated below in Table IV.

TABLE IV

| Plant Type | Plant Part | Total mgPb/kg |
|---|---|---|
| Experimental | | |
| Dogbane | Leaves | 0.92 |
| Dogbane | Stems | 4.10 |
| Dogbane | Roots | 68.20 |
| Sugarbeet | Leaves | 10.04 |
| Sugarbeet | Roots | 79.76 |
| Ragweed | Leaves | 4.76 |
| Ragweed | Stems | 22.84 |
| Ragweed | Roots | 46.92 |
| Control | | |
| Dogbane | Leaves | 0 |
| Dogbane | Stems | 0 |
| Sugarbeet | Leaves | 0.64 |
| Sugarbeet | Roots | 0.32 |
| Ragweed | Leaves | 0 |
| Ragweed | Stems | 0 |
| Ragweed | Roots | 0 |

As can be seen from the data Ragweed accumulates 37.0% of total accumulated lead in the leaves and stems whereas sugarbeet accumulates only 11.2% and hemp dogbane accumulates 6.8%. Although sugarbeet tended to accumulate more total lead than either of the other two plants, the lead was concentrated in the fine root system. Thus ragweed is the most preferred accumulator since it demonstrates a 3 to 5 fold greater ability to accumulate lead in the above ground harvestable parts of the plant.

EXAMPLE 4

Accumulations of Organolead by Ragweed

Water collected from a lead contaminated site was analyzed for lead concentration and was found to contain 14.92 mgPb/kg total lead of which 10.08 mgPb/kg was organolead. Organolead concentrations were determined in the following manner. Water suspected of containing organolead was filtered through a 0.45u Gelman syringe filter and the pH was adjusted to 9.0 by titrating with NaOH. At this pH inorganic lead precipitates out of solution. The solution was again filtered through a 0.45u Gelman syringe filter and lead concentration was determined using the ICP.

Two hydroponic systems, an experimental system and a control system were set up to test the ability of ragweed to accumulate lead species from water contaminated with organolead. The experimental system contained five ragweed seedlings whereas the control system contained no plants. At time 0 hr both systems were perfused with a low phosphate nutrient medium (Table I) containing no lead at a constant flow rate of 30 ml/hr.

Over the course of the experiment the lead contaminated water was introduced into both the control and experimental hydroponic systems and the hydroponic solution in each system was analyzed at periodic intervals for lead content (Table V). The experiment was run for 113 hours at room temperature under growth conditions of 16 hr days and under 100% fluorescent light. At the end of 113 hr the plants were harvested and the roots, leaves, and stems were analyzed for lead content according to the procedure of Example 1. Data are tabulated in Table VI.

TABLE V

| time-hr | Control/total mgPb/kg in soln | Experimental/Total mgPb/kg in soln | % Reduction of lead by Exp. over control |
|---|---|---|---|
| 0 | 0 | 0 | 0% |
| 15 | 4.15 | 1.50 | 64% |
| 40 | 9.28 | 2.81 | 70% |
| 46 | 9.59 | 3.40 | 64% |
| 66 | 9.99 | 3.60 | 64% |
| 91 | 9.80 | 3.38 | 66% |
| 113 | 9.91/Organic 9.13 (91%) | 3.36/Organic 1.70 (51%) | 66% 81% org. lead. absorbed |

*At time 0 hr lead contaminated water had and initial total mgPb/kg of 14.92, 10.8 mgPb/kg was determined to be organolead.

As seen in Table V, the ragweed plants are responsible for a 64% reduction in lead content of the contaminated water sample after only 15 hr, and that level of reduction was maintained over the life of the experiment. At the end of the experiment both total lead and organolead concentrations were determined on the control and experimental hydroponic solutions. In both cases measurements of total lead corresponded to concentrations of organolead indicating that organolead was being remediated from the hydroponic solution. Data on the analysis of the lead content of the roots, leaves, and stems given in Table VI indicate that accumulation of lead by the plant was responsible for a decrease in lead concentration of the contaminated water sample.

TABLE VI

| Plant Type | Plant Part | Total mgPb/kg |
|---|---|---|
| Ragweed | Leaves and Stems | 25.36 |
| Ragweed | Roots | 418.40 |

Thus the use of ragweed is effective in the remediation of lead from liquid media.

EXAMPLE 5

Remediation of a Lead Contaminated Site with Ragweed or Dogbane Crop

Site Preparation

The site to be remediated is prepared by removing most of the non metal accumulating vegetation by physical, chemical, or flame methods known to most in the farming community. Soil is physically disturbed, so as to introduce the seeds or seedlings. This physical disturbance may be done either over the entire site, or only in the immediate area of the planting. The physical disturbance is accomplished by a number of mechanical and manual methods common in farming and gardening. Soil amendments are applied prior to this operation although in some instances these amendments are applied at planting or as a "side dressing" as the plant grows. The surface of the field is left relatively flat except where physical features such as ridges, furrows, or contours are needed to facilitate water retention, or dispersion.

Planting

Planting of ragweed or dogbane seeds, embryos, seedlings or transplants is done either manually or with the aid of machinery designed for such purposes. Depth of planting will very according to seed size and soil texture in a manner well understood by those familiar with agriculture and gardening practises. Soil amendments, such as fertilizer additions, are placed in, beside, or under the planting trench, furrow, or hole immediately prior, during, or after the planting process.

Growing/Maintenance

The ragweed or dogbane plants are fertilized and watered as appropriate. The timing and nature of these applications are based on soil conditions as well as visual plant health clues such as color, height, shape, and turgor pressure. The timing and nature of these additions may take into account recommendations based on leaf tissue elemental analysis. These processes are familiar to state extension agriculturalists and many in the farming community. A plant-pest control program will be employed. This will include control of insect, nematode, plant pathogens, weeds and herbivores. Recommendations for the elimination or control of specific plant pests may be obtained from local agricultural extension agents, agricultural product distributors and numerous books and magazines.

Harvesting

Plants are harvested one or more times during the growing season. The plants are harvested in a manner so as to remove the maximum amount of lead obtainable with harvesting equipment. This includes, cropping techniques and equipment familiar to farmers raising crops intended for use as silage, hay, fodder, straw, grain, sugar, or biomass.

Post-Harvest Processing

Post-harvest processing of the material includes one or more steps that will result in the environmentally acceptable reclamation or disposal of the lead in the plant tissue. The harvested bio-mass is processed directly by a smelter of a design consistent with handling large volumes of combustible materials of low bulk density, containing lead. In the event that a pre-processing step is needed to increase lead concentration, and bulk density, as well as reduce total volume the following is used. Concentration of the bio-mass is accomplished by processes including aerobic digestion (e.g., a compost pile), anaerobic digestion (e.g., enclosed tank), incineration (e.g., ashing), grinding, chopping, pelleting, or chemical (wet) digestion (acid treatment).

Yields

It is expected that one acre of ragweed or dogbane will produce between 15 and 30 tons of dry weight bio-mass per year. It is also expected that as much as 0.2% to 2% of that dry weight will constitute accumulated lead. This will result in the remediation of about 60 lb to 1200 lb of lead per acre per year from contaminated soil.

From the foregoing description, one skilled in the art can easily ascertain the essential characteristics of this invention and, without departing from the spirit and scope thereof, can make various changes and modifications to the invention to adapt it to various usages and conditions.

I claim:

1. A method of obtaining lead from a medium containing lead, comprising:
   (i) growing one or more Ambrosia sp. or Apocynum sp. plants in a medium containing organic or inorganic lead species under conditions suitable for growth of Ambrosia sp. or Apocynum sp. for a time sufficient for plants parts to accumulate lead, wherein said plant accumulates lead in concentrations of from about 100 mg/kg dry weight of the plant in the above-ground portions of said plant;
   (ii) harvesting the plants from the medium; and
   (iii) concentrating the lead.

2. A method according to claim 1 wherein the medium is liquid medium, solid medium, semi-solid medium or a combination thereof.

3. A method according to claim 1 further comprising adding to the medium nutrients necessary for plant growth.

4. A method according to claim 2 wherein the medium is soil, sludge, or compost.

5. A method according to claim 1 wherein the harvesting is carried out on plant parts.

6. A method according to claim 5 wherein the harvesting is carried out on leaves and stems.

7. A method according to claim 5 wherein a sufficient portion of the plant remains after harvesting to continue plant growth.

8. A method according to claim 1 wherein concentration of the lead is carried out by dehydrating, incinerating, smelting, aerobic digesting, or anaerobic digesting of the plant parts.

9. A method according to claim 1 wherein lead is accumulated at a concentration of from about 100 mgPb/kg to about 8000 mgPb/kg dry weight of the plant.

10. A method according to claim 1 wherein the Ambrosia sp. or Apocynum sp. are harvested two or more times.

11. A method of accumulating lead from a medium containing lead, comprising:
    (i) growing one or more Ambrosia sp. or Apocynum sp. plants in a medium containing organic or inorganic lead species under conditions suitable for growth of Ambrosia sp. or Apocynum sp. for a time sufficient for plants parts to accumulate lead, wherein said plant accumulates lead in concentrations of from about 100 mg/kg dry weight of the plant in the above-ground portions of the plant; and
    (ii) harvesting the plants from the medium.

* * * * *

UNITED STATES PATENT AND TRADEMARK OFFICE
CERTIFICATE OF CORRECTION

PATENT NO. : 5,320,663
DATED : June 14, 1994
INVENTOR(S) : Scott Daniel Cunningham It is certified that error appears in the above-indentified patent and that said Letters Patent is hereby corrected as shown below:

Column 10, Table III:

"

| Plant Type | Plant Part | Total mgPb/kg |
|---|---|---|
| Ragweed | Leaves | 1251 |
| Ragweed | Upper Stem | 7.75 |
| Ragweed | Lower Stem | 218 |

"

Change to:

--

| Plant Type | Plant Part | Total mgPb/kg |
|---|---|---|
| Ragweed | Leaves | 7.75 |
| Ragweed | Upper Stem | 218 |
| Ragweed | Lower Stem | 1251 |

--

UNITED STATES PATENT AND TRADEMARK OFFICE
CERTIFICATE OF CORRECTION

PATENT NO. : 5,320,663
DATED : June 14, 1994
INVENTOR(S) : Scott Daniel Cunningham It is certified that error appears in the above-indentified patent and that said Letters Patent is hereby corrected as shown below:

Column 10, lines 55-56:

"The data indicate that ragweed is capable of accumulating 1251 mg Pb/kg from the soil into the leaf tissue."

Change to:

-- The data indicate that ragweed is capable of accumulating significant quantities of Pb into the harvestable biomass. --

Signed and Sealed this

Twenty-second Day of August, 1995

Attest:

BRUCE LEHMAN

Attesting Officer           Commissioner of Patents and Trademarks